Aug. 28, 1951     W. H. BRATTAIN     2,565,799
WAVE TRAIN MAGNETOMETER
Filed July 7, 1944
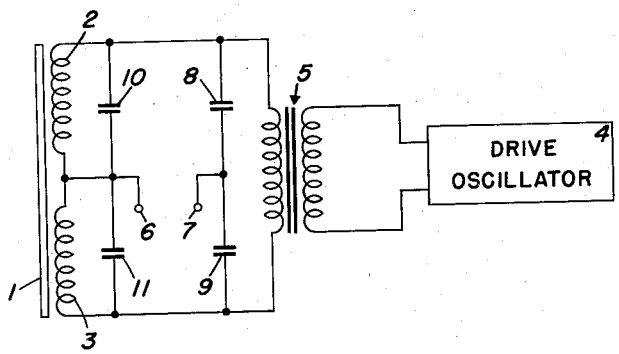
FIG. 1
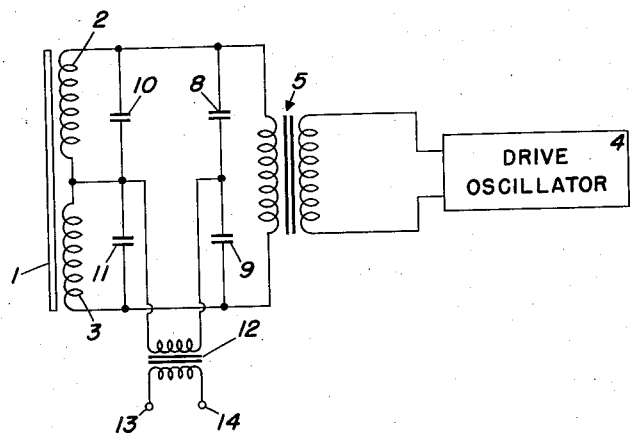
FIG. 2
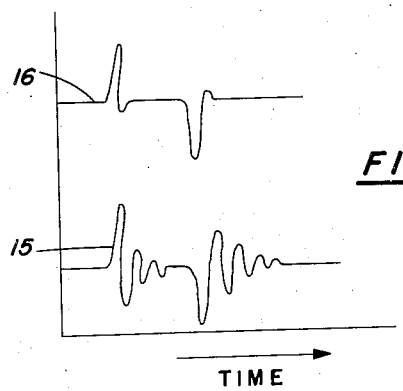
FIG. 3
Inventor
WALTER H. BRATTAIN
Attorney Patented Aug. 28, 1951

2,565,799

UNITED STATES PATENT OFFICE 2,565,799

WAVE-TRAIN MAGNETOMETER

Walter H. Brattain, Chatham, N. J., assignor to the United States of America as represented by the Secretary of the Navy Application July 7, 1944, Serial No. 543,924

2 Claims. (Cl. 177—351)

This invention relalates to magnetometers, and more particularly to magnetometers adapted for measuring the absolute strength of, or changes in the strength of, the earth's magnetic field.

It is well known to make a magnetometer by employing a magnetic core associated with a winding, and applying to the winding an alternating driving voltage of sufficient amplitude to drive the magnetic cores beyond magnetic saturation first in one direction and then in the other direction. The relatively sharp diphasic pulses which are induced in the windings by this type of drive are utilized to provide a measure of the ambient magnetic field. If the magnetometer is of the unbalanced type, as for example that disclosed in copending application Serial No. 516,612, Filed Jan. 1, 1944, for Unbalanced Magnetometers, by Otto H. Schmitt, now patent 2,560,132, issued July 10, 1951, a change in the strength of the magnetic field produces a corresponding change in the relative voltage of the alternate pulses, and a change in the sense of the ambient magnetic field is indicated by the phase of the pulse envelope.

In magnetometers of the saturated-core type, such as described above, it is necessary to employ relatively complicated electronic equipment in order to obtain useful indications of small changes in the strength of the magnetic field and hence in the heights of the diphasic pulses. Because of the relatively short time duration of each of these pulses, the wave form represents extremely minute amounts of energy, so that the output signal from magnetometer elements of this type must be subjected to extremely high amplification to secure a useful indication of small changes in the strength of the magnetic field.

It is an object of the present invention to provide an improved magnetometer in which the output of the magnetometer elements is so utilized as to provide a signal of a wave form having an appreciable energy content, whereby the amount of equipment subsequently needed in order to obtain a usable indication of small changes in the magnetic field under observation is substantially minimized. It is a further object of the invention so to arrange the magnetometer circuit as to take advantage of components of the output signal of the magnetometer elements which previously had been neglected completely or, at best, considered extraneous and undesirable.

Following a careful study of the theory of operation of previously known saturated-core magnetometers, it has been found that, with relatively simple changes in the circuit arrangements, the output signal of the magnetometer may be made to have the form of a series of wave trains. These wave trains may be thought of as the carrier of the signal, their envelope being in a sense modulated by the drive frequency to convey intelligence regarding the magnetic field under observation. If the magnetometer is of the balanced type, the maximum amplitude of this envelope is a function of the strength of the magnetic field. In the case of the unbalanced magnetometer, mentioned above, the sense of the magnetic field is also indicated by the phase of the envelope. By proper choice of circuit constants in an arrangement in accordance with the present invention, the individual wave trains may be elongated, if desired, to form a continuous or substantially continuous output signal. It will be apparent to those skilled in the art that such an output signal lends itself much more readily to utilization, with resultant improved sensitivity and a better over-all signal-to-noise ratio. These and other advantages are realized by use of the present invention.

In accordance with the present invention, there is provided a method of measuring the strength of a magnetic field which comprises the steps of periodically saturating a core of magnetic material in alternate senses, the core being disposed in the magnetic field, inducing corresponding pulses in a winding associated with the core, and utilizing the winding in a resonant circuit to provide a series of wave trains having an envelope the maximum amplitude of which is a function of the strength of the magnetic field. The invention also contemplates the provision of means for carrying out the above method comprising, in combination, a magnetic core disposed in the magnetic field, means for periodically saturating the core in alternate senses, a winding associated with the core, and a resonant circuit including the winding and adapted to provide a series of wave trains having an envelope the maximum amplitude of which is a function of the strength of the magnetic field.

Also in accordance with the present invention, there are provided means for and the method of determining the sense of the magnetic field under observation, as well as its strength. This is accomplished by unbalancing the resonant bridge circuit including the magnetometer winding, as for example by shunting an impedance across a portion thereof as disclosed in the above-mentioned copending application Serial No.

516,612, filed January 1, 1944, for Unbalanced Magnetometers, by Otto H. Schmitt. In this case, the phase of the envelope will be dependent on the sense of the magnetic field.

For a better understanding of the invention, together with other and further objects thereof, reference is made to the following description taken in connection with the accompanying drawings, and its scope will be pointed out in the appended claims.

In the accompanying drawings:

Figure 1 is a circuit diagram of a magnetometer in accordance with the present invention;

Figure 2 shows, schematically, a modification of the magnetometer of Figure 1; and Figure 3 shows, in graphical form, the type of output signal realizable with the magnetometer of Figure 1 or of Figure 2 compared with that obtained from previous magnetometers.

Referring now more specifically to Figure 1, there is shown a magnetometer element comprising magnetic core 1 having associated with it a winding comprising coils 2 and 3. Coils 2 and 3 in series are supplied with driving voltage from drive oscillator 4 through transformer 5. The output voltage appears at terminals 6 and 7, terminal 6 being connected to the junction of coils 2 and 3, and terminal 7 being connected to the junction of capacitors 8 and 9 which in turn are connected in series across the free terminals of coils 2 and 3. The distributed capacitance inherent in coils 2 and 3, taken alone or in combination with additional capacitance optionally included as described below, is indicated diagrammatically by capacitors 10 and 11, respectively.

In operation, drive oscillator 4 produces a voltage across coils 2 and 3 in series which saturates magnetic core 1 first in one sense and then in the other. The inductance of coils 2 and 3, which are effectively in shunt due to the bridge connections, forms a parallel resonant circuit in combination with capacitors 10 and 11, which are also effectively in shunt due to the same bridge connections. The resonant frequency of this circuit depends, of course, upon the design of coils 2 and 3 and upon whether capacitors 10 and 11 comprise capacitance in addition to the distributed capacitance of coils 2 and 3. In accordance with the invention, these circuit variables are preferably chosen so that the resonant frequency of the parallel circuit provides oscillatory peaks of maximum amplitude when drive oscillator 4 operates at a given frequency.

The values of capacitors 8 and 9 have no appreciable effect upon the properties of the parallel resonant circuit provided that a load of relatively high impedance is connected to output terminals 6 and 7. If a relatively low resistive load is used, however, the damping of the parallel resonant circuit will be appreciably increased. Even if the circuit is thus loaded to the point of critical damping, the resultant output signal will comprise peaks of substantially greater duration and of somewhat lower amplitude compared with those obtained from previously known magnetometers.

It will be understood that the dividing network of the magnetometer bridge which, in Figure 1, comprises capacitors 8 and 9, may equally well be resistive or inductive. In the first case, equal resistors would simply be substituted for capacitors 8 and 9. In the second case, either of two arrangements may be employed. Capacitors 8 and 9 could each be eliminated and transformer 5 could have its secondary winding provided with a center tap to which output terminal 7 would be connected.

Whether or not the arrangement of Figure 1 provides an output signal of wave trains having the desired characteristics depends to a large extent upon the dissipation constant or "Q" of the parallel resonant circuit formed by coils 2 and 3 and capacitors 10 and 11. In the event that other considerations make it desirable to employ a magnetometer winding which results in a relatively low Q, the arrangement shown in Figure 2 will be found especially advantageous. The general arrangement shown in this figure is similar to that shown in Figure 1, and like components have the same designations. The primary winding of output transformer 12 is connected between the junction of capacitors 8 and 9 and the junction of capacitors 10 and 11. The secondary winding of this output transformer connects to output terminals 13 and 14.

In operation, capacitors 8 and 9, which are effectively in shunt due to the bridge connections, form a series resonant circuit in combination with the inductance of the primary winding or transformer 12. By proper choice of the values of capacitors 8 and 9 in view of the inductance of this winding, the series resonant circuit may be given a resonant frequency such that the effective output signal is not only substantially increased in voltage due to resonant gain but is desirably modified in wave form so that it comprises a series of wave trains of suitable characteristics in spite of the relatively low Q which the parallel resonant circuit comprising coils 2 and 3 and capacitors 10 and 11 may have. It will be understood that transformer 12 may be replaced by an inductor connected between the junction of capacitors 8 and 9 and the junction of capacitors 10 and 11. This inductor, which is thus effectively in shunt with output terminals 13 and 14, will function in the manner above described to produce series resonance in combination with capacitors 8 and 9. In practice, the frequency of the series resonant circuit just described is generally chosen substantially to equal that of the previously described parallel resonant circuit. It has been found that, at least to a first order of magnitude, the circuit constants of the series resonant circuit have no appreciable effect upon the frequency of the parallel resonant circuit, and vice versa.

In either of the arrangements of Figures 1 and 2, unbalance may be provided, in accordance with the disclosure of copending application Serial No. 516,612, filed January 1, 1944, for Unbalanced Magnetomers, by Otto H. Schmitt, by making one of capacitors 10 and 11 appreciably larger than the other. Alternatively, unbalance may readily be secured by shunting a suitable resistor across one or the other of coils 2 and 3. It will be understood that neither of these expedients for the purpose of securing unbalance will have any substantial effect upon the improved performance realizable in accordance with the present invention, but that the use of such expedients will permit securing, in addition, the advantages inherent in the unbalanced magnetometer of the above-mentioned application.

The general type of output signal secured with magnetometers in accordance with either of Figures 1 and 2 is shown graphically in Figure 3 by curve 15. For purposes of comparison, curve 16 represents the pulse output of the conventional saturated-core magnetometer. In general, the envelope of the output signal, when the magnetometer is operated in the balanced condition, consists principally of a component having twice the frequency of drive oscillator 4. A change in the strength of the ambient magnetic field is indicated by a change in the amplitude of the envelope. In the unbalanced condition with no ambient magnetic field, the only important component has twice the drive frequency. When an ambient magnetic field is present, a component having a frequency equal to that of the drive frequency appears. The phase of the latter component depends upon the sense of the ambient magnetic field.

In one successful embodiment in accordance with Figure 2 of the drawings, magnetic core 1, made of 4-79 molybdenum Permalloy, had a length of 4.8 inches, a width of 0.125 inch and a thickness of 0.014 inch. Coils 2 and 3 each comprised 2000 turns of B and S No. 40 wire, and each had a direct-current resistance of approximately 85 ohms. The effective parallel inductance of the two coils was approximately 1.5 millihenrys, and the effective parallel alternating-current resistance was approximately 42.5 ohms. The effective parallel distributed capacitance was approximately 1000 micromicrofarads. Capacitors 8 and 9 each had a capacitance of 0.0027 microfarad, and capacitors 10 and 11 a capacitance of 0.08 microfarad each. Transformer 12 had a step-up turns ratio of 4.6:1, and a primary inductance of approximately 45 millihenrys. Drive oscillator 4 had a frequency of approximately 400 cycles per second, and the system operated at a resonant frequency of approximately 10 kilocycles per second. In a modification of Figure 2, capacitors 8 and 9 were changed to 300 micromicrofarads each, and capacitors 10 and 11 to 0.02 microfarad each. Transformer 12 was replaced by an inductance coil having an inductance value of approximately 100 millihenrys. In the case, the operating frequency was approximately 20 kilocycles per second.

It will be understood that magnetometers in accordance with the present invention may equally well be made using, instead of the single core and single winding shown in Figures 1 and 2 of the drawings, a core with two separate windings, a pair of cores each with a single winding, a pair of cores each with two windings, or a single core having three windings. In certain of these arrangements, the series resonant circuit need not necessarily include elements common to the magnetometer-bridge circuit, so that capacitors 8 and 9 may in some instances be eliminated. These and other modifications may be made without departing from the scope of the present invention.

As an additional advantage of the present invention, it has been found that the use of capacitance effectively in shunt with the magnetometer element substantially improves the signal-to-noise ratio of the magnetometer element itself, this improvement in some cases being as great as two times compared with similar saturated-core magnetometers utilized in the conventional manner.

While the arrangements of the present invention are especially useful as ordinary magnetometers, it will be understood that they are not limited to such uses, but may within the scope of the present invention be adapted for other purposes, as for example for use in magnetic amplifiers.

What is claimed is:

1. A magnetometer for measuring the strength of a magnetic field comprising, in combination, a magnetic core disposed in said field, oscillator means for periodically saturating said core in alternate senses including a winding associated with said core, and a resonant circuit including said winding constructed and arranged so that the resonant circuit will resonate at a multi-frequency of the drive frequency and have a resistance below a critical value so that decay occurs before the next cycle commences, thereby providing a series of wave trains having an envelope the maximum amplitude of which is a function of the strength of said magnetic field.

2. A magnetometer for measuring the strength and determining the sense of a magnetic field comprising, in combination, a magnetic core disposed in said field, oscillator means for periodically saturating said core in alternate senses including a winding associated with said core, and an unbalanced resonant bridge circuit including said winding constructed and arranged so that the resonant circuit will resonate at a multi-frequency and have a resistance below a critical value so that decay occurs before the next cycle commences, thereby providing a series of wave trains having an envelope the maximum amplitude of which is a function of the strength of said magnetic field and the phase of which depends upon the sense of said magnetic field.

WALTER H. BRATTAIN.

REFERENCES CITED

The following references are of record in the file of this patent:

UNITED STATES PATENTS

| Number | Name | Date |
| --- | --- | --- |
| 2,053,154 | La Pierre | Sept. 1, 1936 |
| 2,252,059 | Barth | Aug. 12, 1941 |